UNITED STATES PATENT OFFICE.

ERNEST SOLVAY, OF BRUSSELS, BELGIUM.

PROCESS FOR THE MANUFACTURE OF CEMENT.

SPECIFICATION forming part of Letters Patent No. 231,858, dated August 31, 1880.

Application filed June 9, 1880. (No specimens.) Patented in England February 25, 1880.

*To all whom it may concern:*

Be it known that I, ERNEST SOLVAY, of Brussels, in the Kingdom of Belgium, manufacturer, have invented a new or Improved Process for the Manufacture of Cement, (for which I have obtained a patent in England, No. 840, bearing date February 25, 1880,) of which the following is a specification.

When chloride of calcium is decomposed by a silicate of alumina, such as clay, as is the case when it is required to obtain chlorine or hydrochloric acid from it, the residue is a silico-aluminate of lime. I have discovered that this residue may be prepared so as to constitute the basis of a manufacture of cement, which is the object of my present invention.

The process consists of two operations: first, the preparation of the silico-aluminate of lime, and, secondly, the conversion of the silico-aluminate of lime into cement.

First operation: It is proper, first, to choose for mixture with the chloride of calcium a clay composed of the required quantities of silica and alumina, and containing no foreign matters which might be injurious to the quality of the cement which is to be manufactured. Then the smallest quantity of the said clay necessary for effecting the complete decomposition of the chloride of calcium is to be mixed with the said chloride of calcium, and it is also necessary that the decomposition should be effected at the lowest temperature possible.

Second operation: When a soft silico-aluminate of lime has been thus obtained, which is readily ascertained by its being easily attacked by weak acids, I crush it and mix it intimately with a small quantity of fine lime, calcining the said mixture, if necessary. The cement is then constituted.

I claim as my invention—

The process of manufacturing cement by the two operations hereinbefore described—that is to say, first, in the treatment of chloride of calcium by means of clay, preparing a soft silico-aluminate of lime containing no injurious substances, and, secondly, adding lime in intimate admixture to the said soft silico-aluminate of lime.

ERNEST SOLVAY.

Witnesses:
R. S. KIRKPATRICK,
H. T. E. KIRKPATRICK.